United States Patent [19]

Funayama et al.

[11] Patent Number: 4,975,512

[45] Date of Patent: Dec. 4, 1990

[54] REFORMED POLYSILAZANE AND METHOD OF PRODUCING SAME

[75] Inventors: Osamu Funayama; Mikiro Arai, both of Saitama; Takeshi Isoda, Niiza, all of Japan

[73] Assignees: Petroleum Energy Center, Japan; TOA Nenryo Kogyo Kabushiki Kaisha, Japan

[21] Appl. No.: 230,422

[22] Filed: Aug. 10, 1988

[30] Foreign Application Priority Data

| Aug. 13, 1987 [JP] | Japan | 62-202767 |
| Feb. 8, 1988 [JP] | Japan | 63-028295 |
| Feb. 8, 1988 [JP] | Japan | 63-028296 |

[51] Int. Cl.$^5$ ............................................. C08G 77/388
[52] U.S. Cl. ...................................... 528/28; 528/31; 528/38; 525/474
[58] Field of Search .......................... 528/28, 31, 38; 556/412; 525/474

[56] References Cited

U.S. PATENT DOCUMENTS

| 2,579,418 | 12/1951 | Chernonis | 525/477 |
| 3,291,760 | 12/1966 | Bayer | 260/2 |
| 3,354,098 | 11/1967 | Byrd | 528/28 |
| 3,431,222 | 3/1969 | Fink | 528/28 |
| 3,518,289 | 6/1970 | Pearce | 528/38 |
| 3,518,290 | 6/1970 | Pearce | 528/38 |
| 4,482,669 | 11/1984 | Seyferth | 528/28 |
| 4,656,300 | 4/1987 | Lebrun et al. | 528/38 |
| 4,659,850 | 4/1987 | Arai et al. | 528/28 |
| 4,788,309 | 11/1988 | Laine et al. | 528/28 |

FOREIGN PATENT DOCUMENTS 0153008 8/1985 European Pat. Off. .
8606377 11/1986 World Int. Prop. O. .

*Primary Examiner*—John C. Bleutge
*Assistant Examiner*—Ralph Dean
*Attorney, Agent, or Firm*—Lorusso & Loud

[57] ABSTRACT

A novel, reformed polysilazane obtained by reacting a polysilazane with a compound selected from ammonia, primary and secondary amines, hydrazine and mono-, di- and tri-substituted hydrazines to cross-link the polysilazane with the compound serving as a cross-linking agent or to link the compound to the polysilazane.

17 Claims, No Drawings

REFORMED POLYSILAZANE AND METHOD OF PRODUCING SAME

This invention relates to a novel, reformed polysilazane and to a method of preparing same.

There are known polysilazanes which are proposed to be used as a precursor material for the production of silicon nitride-containing ceramics. Known polysilazanes are liquid or solid and the solid polysilazanes are insoluble in an organic solvent such as toluene. For example, A. Stock discloses an inorganic polysilazane of the formula $-SiH_2NH_n$ prepared by reacting dichlorosilane with ammonia using benzene as a solvent (Ber. 54, 740 (1921)). This inorganic polysilazane is an oligomer (n=7 to 8) and is viscous liquid at room temperature. D. Seyferth et al suggest an inorganic polysilazane obtained by reacting dichlorosilane with ammonia using dichloromethane as a solvent (U.S. Pat. No. 4,397,828). This polysilazane is an oily liquid having a proton ratio Si—H/N—H of about 3.3 and becomes solidified when heated at about 200° C. or allowed to stand for 3-5 days. The solidified polysilazane is insoluble in an organic solvent such as o-xylene. Japanese Published Unexamined Patent Application (Tokkyo Kokai) No. 60-145,903 discloses an inorganic polysilazane having a molecular weight of 690–2,000 and obtained by reacting a dihalosilane adduct such as a dichlorosilane-pyridine adduct with ammonia. The resultant polysilazane upon removal of the solvent therefrom is a viscous liquid or a resinous solid. This solid, however, is insoluble in an organic solvent such as o-xylene.

In utilizing an inorganic polysilazane as raw materials for ceramic fibers, binders, coating agents or the like, it is highly desirable that the polysilazane be soluble in an organic solvent, have a high molecular weight and exhibit good spinnability, solidifiability and moldability. In these respects, the above-described known inorganic polysilazanes are not fully satisfactory.

The present invention has been made with the foregoing problems of the conventional inorganic polysilazane in view and provides a reformed polysilazane having a number average molecular weight of 200–500,000 and containing (a) a recurring unit of the formula:

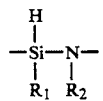

wherein $R_1$ and $R_2$, independently from each other, stand for hydrogen, an alkyl, an alkenyl, a cycloalkyl, an alkylamino, aryl or an alkylsilyl, and (b) one or more cross-linkages of the formula:

wherein A stands for a direct bond or $-N(R_4)-$ where $R_4$ stands for hydrogen, an alkyl, a cycloalkyl, an aryl, an aralkyl or a heterocyclic group, and $R_3$ stands for (1) hydrogen, an alkyl, an alkenyl, a cycloalkyl, an aryl, an aralkyl or $-N(R_5)(R_6)-$ where $R_5$ and $R_6$, independently from each other, stand for an alkyl, a cycloalkyl, an aryl, an aralkyl or a heterocyclic group, when the group A is a direct bond or (2) hydrogen, an alkyl, an alkenyl, a cycloalkyl, an aryl, an aralkyl or a heterocyclic group, when the group A is $-N(R_4)-$ or (c) one or more groups of the formula:

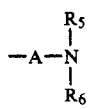

wherein A, $R_5$ and $R_6$ have the same meaning as above.

In another aspect, the present invention provides a method of reforming a polysilazane having a number average molecular weight of 100–50,000 and containing a recurring unit of the formula:

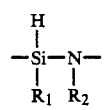

wherein $R_1$ and $R_2$, independently from each other, stand for hydrogen, an alkyl, an alkenyl, a cycloalkyl, an alkylamino, aryl, an aralkyl or an alkylsilyl, said method comprising reacting the polysilazane in an organic base-containing solvent with a compound of the formula:

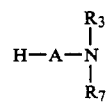

wherein A stands for a direct bond or $-N(R_4)-$ where $R_4$ stands for hydrogen, an alkyl, an alkenyl, a cycloalkyl, an aryl, an aralkyl or a heterocyclic group, and $R_3$ and $R_7$, independently from each other, stand for hydrogen, an alkyl, an alkenyl, a cycloalkyl, an aryl, an aralkyl or a heterocyclic group.

The present invention also provides a reformed polysilazane obtained by the above method.

The present invention will now be described in detail below.

The raw material inorganic polysilazane to be used in the method according to the present invention has as its main skeletal structure represented by the following recurring unit:

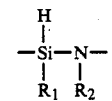

wherein $R_1$ and $R_2$, independently from each other, stand for hydrogen, an alkyl such as methyl, ethyl, propyl, butyl, octyl or decyl; an alkenyl such as vinyl, allyl, butenyl, octenyl or decenyl; a cycloalkyl such as cyclohexyl or methylcyclohexyl; an alkylamino such as methylamino or ethylamino; an aryl such as phenyl, tolyl, xylyl or naphthyl; an aralkyl such as benzyl; or an alkylsilyl such as methylsilyl, ethylsilyl, propylsilyl, butylsilyl, octylsilyl or decylsilyl. These alkyl, alkenyl, cycloalkyl, aryl, alkyl amino, aralkyl and alkylsilyl groups may each optionally be substituted by one or more substituents, which are inert to the protons bonded to the silicon atoms of the polysilazane skeleton, such as an alkyl, an aryl, an alkoxy and an alkoxycarbonyl.

The raw material polysilazane having a number average molecular weight of 100–50,000, preferably 300–2,000, more preferably 600–1,400 is used. The polysilazane may have a cyclic or linear form. Polysilazanes having both cyclic and linear portions may also be suitably used. Examples of suitable raw material polysilazanes to be used for the purpose of the present invention are those obtained by the methods disclosed in:

Japanese Tokkyo Kokai No. 60-145903;
U.S. Pat. No. 4,397,828 (Seyferth et al);
Ber. 54, (1921), p740 (Stock);
Inorg. Chem. (1972), 11 (Scantlin et al);
U.S. Pat. No. 3,318,823 (Aylett);
U.S. Pat. No. 4,482,669 (Seyferth et al);
Japanese Tokkyo Kokai No. 61-89230.

The above polysilazane is reacted with a compound of the following general formula (I) in an organic base-containing solvent:

wherein A stands for a direct bond or —N($R_4$)— where $R_4$ stands for hydrogen, an alkyl, an alkenyl, a cycloalkyl, an aryl, an aralkyl or a heterocyclic group, and $R_3$ and $R_7$, independently from each other, stand for hydrogen, an alkyl, an alkenyl, a cycloalkyl, an aryl, an aralkyl or a heterocyclic group. The alkyl, alkenyl, cycloalkyl, aryl, aralkyl and heterocyclic groups represented by the symbols $R_3$, $R_4$ and $R_7$ may optionally be substituted by one or more substituents, which are inert to the protons on the silicon atoms of the polysilazane skeleton, such as alkyl, aryl, alkoxy and alkoxycarbonyl groups.

The compounds expressed by the general formula (I) include:
1. ammonia;
2. hydrazine;
3. primary amine of the formula $R_3NH_2$;
4. 1-mono-substituted hydrazine of the formula $R_3NH—NH_2$;
5. 1,2-di-substituted hydrazine of the formula $R_3NH—NHR_4$;
6. 1,1-di-substituted hydrazine of the formula $R_3R_7N—NH_2$;
7. secondary amine of the formula $R_3R_7NH$; and
8. 1,1,2-tri-substituted hydrazine of the formula $R_3R_7N—NHR_4$.

Illustrative of suitable primary amines are methylamine, ethylamine, propylamine, isopropylamine, butylamine, isobutylamine, amylamine, hexylamine, heptylamine, octylamine, allylamine, crotylamine, cyclopropylamine, cyclobutylamine, cyclopentylamine, cyclohexylamine, 2-methylcyclohexylamine, 2-amino-1-cyclopentylpropane, aniline, toluidine, benzylamine and naphthylamine.

Illustrative of suitable 1-mono-substituted hydrazines are methylhydrazine, ethylhydrazine, isopropylhydrazine, propylhydrazine, phenylhydrazine, benzylhydrazine, 2-methylphenylhydrazine, 3-methylphenylhydrazine, 4-methylphenylhydrazine, 4-ethylphenylhydrazine, 1-phenylethylhydrazine, 2-phenylethylhydrazine, 1-naphthylhydrazine, 2-naphthylhydrazine, 2-hydrzinobiphenyl, 3-hydrazinobiphenyl, 4-hydrazinobiphenyl, 1-hydrazinophthalazine, 2-hydrazinoquinoline, 3-hydrazinoquinoline, 4-hydrazinoquinoline and 8-hydrazinoquinoline.

Illustrative of suitable 1,2-di-substituted hydrazines are 1,2-dimethylhydrazine, 1,2-diethylhydrazine, 1-isopropyl-2-methylhydrazine, 1-methyl-2-phenylhydrazine, 1-ethyl-2-phenylhydrazine, 1,2-dibenzylhydrazine, 2,2'-hydrazobiphenyl, 4,4-hydrazobiphenyl, 2,2'-diemthylhydrazobenzene, 2,4-dimethylhydrazobenzene, 3,3'-dimethylhydrazobenzene, 3,4'-dimethylhydrazobenzene, 3,5-dimethylhydrazobenzene, 4,4'-dimethylhydrazobenzene, 2-aminohydrazobenzene, 3-aminohydrazobenene, 4-aminohydrazobenzene, 1,2-di(1-naphtyl)hydrazine, 1,2-di(2-naphthyl)hydrazine, 2,2',3,3'-tetramethylhydrazobenzene, 2,2',4,4'-tetramethylhydrazobenzene, 2,2',5,5'-tetramethylhydrazobenzene, 3,3',4,4'-tetramethylhydrazobenzene and 3,3',5,5'-tetramethylhydrazobenzene.

Illustrative of suitable 1,1-di-substituted hydrazines are 1,1-dimethylhydrazine, 1,1-diethylhydrazine, 1-methyl-1-phenylhydrazine, 1-ethyl-1-phenylhydrazine, 1,1-diphenylhydrazine, 1,1-dibenzylhydrazine, 1,1-di(1-naphthyl)hydrazine and 1,1-di(2-naphthyl)hydrazine.

Illustrative of suitable secondary amines are dimethylamine, diethylamine, methylethylamine, dipropylamine, diisopropylamine, methylpropylamine, dibutylamine, diamylamine, dihexylamine, diheptylamine, dioctylamine, diallylamine, allylcyclohexylamine, methylaniline, ethylaniline, dibenzylamine, diphenylamine, dicyclohexylamine and N-cyclohexylaniline.

Illustrative of suitable 1,1,2-tri-substituted hydrazines are trimethylhydrazine, triethylhydrazine, tripropylhydrazine, triphenylhydrazine, 1,2-dimethyl-1-phenylhydrazine, 1,1-dimethyl-2-phenylhydrazine and benzilidenemethylhydrazine.

In carrying out the reforming of the polysilazane with the compound (I), these materials are dissolved in an organic base-containing solvent and the solution is subjected to dehydrogenative polycondensation conditions. The organic base-containing solvent may be either a liquid organic base or a nonbasic organic solvent having dissolved therein an organic base.

Any liquid organic base which does not react with the raw material polysilazane may be used as the organic base-containing solvent. Illustrative of suitable liquid organic bases are tertiary amines such as trimethylamine, dimethylethylamine, diethylmethylamine, triethylamine, pyridine and a substituted pyridine, dimethylaniline and a substituted dimethylaniline, pyrazine and a substituted pyrazine, pyrimidine and a subsituted pyrimidine, pyridazine and a substituted pyridazine, pyrrole, 3-pyrroline, pyrazole, 2-pyrazoline and mixtures thereof.

The organic base to be dissolved in the non-basic organic solvent may be tertiary amines such as described immediately above, secondary amines having bulky groups and phosphines. The non-basic organic solvent may be, for example, aliphatic hydrocarbons, alicyclic hydrocarbons, aromatic hydrocarbons, halogenated hydrocarbons, aliphatic ethers and alicyclic ethers. Illustrative of suitable non-basic organic solvents are methylene chloride, chloroform, carbon tetrachloride, bromoform, ethylene chloride, ethylidene chloride, trichloroethane, tetrachloroethane, ethyl ether, isopropyl ether, ethyl butyl ether, butyl ether, 1,2-dioxyethane, dioxane, dimethyl dioxane, tetrahydrofuran, tetrahydropyrane, pentane, hexane, isohexane, methylpentane, heptane, isoheptane, octane, isooctane, cyclopentane, methylcyclopentane, cyclohexane, methylcyclohexane, benzene, toluene, xylene, ethylbenzene and mixtures thereof.

The amount of the organic base is at least 5 parts by weight, preferably at least 20% by weight per 100 parts by weight of the non-basic organic solvent.

The solution of the raw material polysilazane in the organic base-containing solvent generally has a concentration of 0.1-50% by weight. Too high a concentration of the polysilazane in excess of 50% by weight causes a difficulty in controlling the reaction. On the other hand, too low a concentration below 0.1% by weight is undesirable because the reaction proceeds too slowly. The concentration of the raw material polysilazane is preferably 1-12% by weight.

The compound of the formula (I) may be used generally in an amount of 0.001-2000mols, preferably 0.1-1000 mols per mole of the raw material polysilazane when the compound (I) is ammonia or hydrazine and in an amount of 0.01-5000 mols, preferably 0.5-1000 mols per mole of the polysilazane when the compound (I) is a primary or secondary amine or a substituted hydrazine.

The reaction is performed at a temperature of generally $-78°$ to $300°$ C., preferably $-48°$ to $200°$ C. A temperature below $-78°$ C. is insufficient to effect the reforming reaction while too high a temperature in excess of $300°$ C. causes difficulties in homogeneously proceeding the reaction. Preferably the reaction is carried out in an atmosphere of dry nitrogen, dry argon or the like inert atmosphere. When the reaction is performed in a closed reactor such as autoclave, the reaction pressure becomes increased as the reaction proceeds because of the in situ production of hydrogen gas. It is not necessary, however, to carry out the polycondensation in a pressurized condition. The reaction may be performed under ambient pressure. The reaction time varies with the kinds and concentrations of the raw material polysilazane and the organic base, the reaction temperature adopted and the intended properties of the reformed polysilazane product but generaly in the range of about 0.5-20 hours. The optimum reaction conditions vary with the average molecular weight and molecular weight distribution of the raw material polysilazane. More severe conditions are generally adopted as the molecular weight of the raw material polysilazane becomes low.

The reaction mixture after the completion of the reforming reaction is generally a solution containing the reformed polysilazane and the organic base-containing solvent. It is desirable to reduce the concentration of the organic base in the reaction product, since otherwise a gellation of the reaction mixture will result when it is allowed to stand for a long time at room temperature. The reduction of the concentration of the organic base may be effected by removing at least a portion of the organic base by distillation and substituting therefor a suitable amount of a non-basic organic solvent such as a hydrocarbon, a halogenated hydrocarbon or an ether. The non-basic organic solvents exemplified previously are suitably used. Such a replacement operation may be repeated twice or more, if desired, to obtain a stable solution of the reformed polysilazane. In particular, it is preferred that the concentration of the organic base in the reformed polysilaznae solution be 30% or less, more preferably 5% or less based on the total weight of the organic base and the non-basic organic solvent contained in the solution.

When the compound (I) is ammonia, hydrazine, a primary amine, a mono or di-substituted hydrazine, the reforming reaction involves dehydrogenative cross-linking reactions with the compound (I) serving as a cross-linking agent. Additionally, when the group $R_2$ of the raw material polysilazane is hydrogen, direct cross-linking between the polysilazane can occur. These reactions may be schematically shown as follows:

(A) When both $R_1$ and $R_2$ are organic groups:

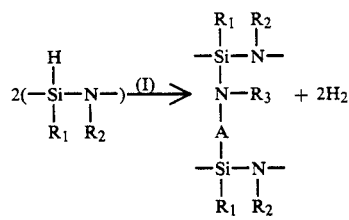

(B) When $R_1$ is hydrogen and $R_2$ is an organic group:

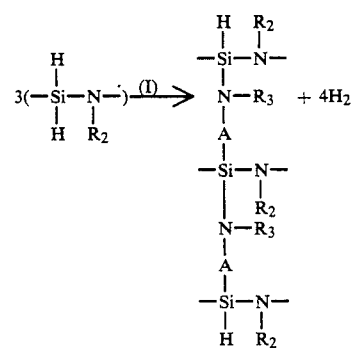

(C) When $R_1$ is an organic group and $R_2$ is hydrogen:

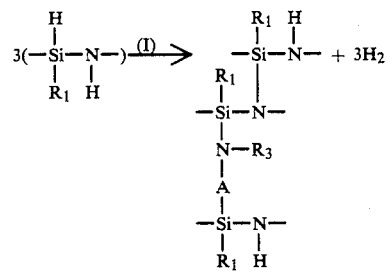

(D) When both $R_1$ and $R_2$ are hydrogen:

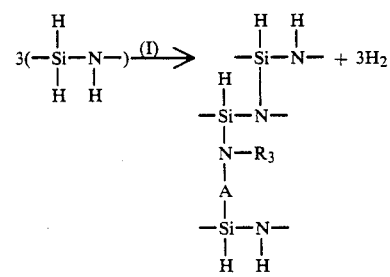

When the compound (I) is a secondary amine or a trisubstituted hydrazine, dehydrogenative condensation reaction between the polysilazane and the compound (I) occurs as schematically shown as follows:

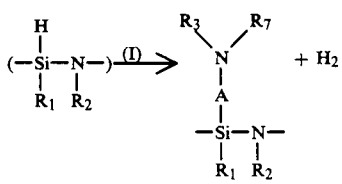

The reformed polysilazane according to the present invention is a polymer obtained by the polycondensation reaction of the raw material polysilazane and the compound of the formula (I) and has newly introduced bonding of either —A—NR$_3$— which cross-links the polysilazane molecules to each other or —A—NR$_3$R$_7$. Thus, the reformed polysilazane has a larger molecular weight than the raw material polysilazane. The reformed polysilazane has a molecular weight of 200–500,000, preferably 1000–50,000, more preferably 1,500–10,000. In the case of reformed polysilazanes obtained using ammonia as compound (I), the, molecular weight thereof is preferably more than 2,000.

In addition, the reformed polysilazane has a higher content of nitrogen atoms than the raw material polysilazane. For instance, the atomic ratios N/Si of perhydropolysilazane, methylhydrosilazane, N-methylsilazane, N-(triethylsilyl)allylsilazane, N-(dimethylamino)cyclohexylsilazane and phenylpolysilazine are increased upon being converted into the reformed polysilazanes from 0.60–0.75 to 0.80 or more, from 0.90–0.97 to 0.98 or more, from 0.67–1.50 to 1.6 or more, from 0.55–0.70 to 0.87 or more, from 1.1–2.0 to 2.2 or more, and from 0.85–0.96 to 0.98 or more, respectively. The N/Si ratio of the reformed polysilazane may be increased to any extent as long as the solubility of the reformed polysilazane in an organic solvent such as o-xylene is not adversely affected. Generally, the N/Si atomic ratio of the reformed polysilazane is not greater than 2.5, preferably not greater than 2.0.

The reformed polysilazane is also distinct from the raw material polysilazane in an increased number of branched side chains. For this reason, even when the polycondensation results in the formation of a reformed polysilazane which becomes solidified upon removal of the solvent, this solid is soluble in an organic solvent such as o-xylene, notwithstanding its high molecular weight. The branched chains are considered to result from the following reaction:

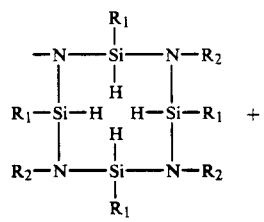

-continued

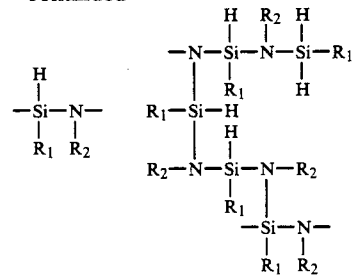

When the group R$_1$ of the raw material polysilazane is hydrogen, the formation of the branched chains may be confirmed by comparing proton NMR spectra of the reformed polysilazane and the raw material polysilazane. Namely, the integration (S$_{2H}$) of the peak at δ4.8 ppm (attributed to the SiH$_2$ group) and that (S$_{3H}$) of the peak at δ4.4 ppm (attributed to the SiH$_3$ group) gives a SiH$_2$/SiH$_3$ molar ratio (=3S$_2$H/2S$_3$H). While the SiH$_2$/SiH$_3$ molar ratio is 5.0–19.0 in the case of the raw material polysilazane, the reformed product gives a reduced SiH$_2$/SiH$_3$ molar ratio of 2.5–8.4.

As having been described in the foregoing, since the reformed polysilazane of the present invention is soluble in various organic solvents and since it is able to be converted into silicon nitride or silicon nitride-containing ceramics upon calcination, shaped ceramic bodies such as continuous fibers, films and coatings which are excellent in various properties such as mechanical strengths at elevated temperatures, heat resistance, corrosion resistance, oxidation resistance and resistance to thermal shock may be obtained. The high ceramic yield of the reformed polysilazane also permits the use thereof as binders and impregnating materials. Moreover, the reformed polysilazane, which is free of undesirable impurities such as metal catalysts, catalysts causing decomposition of the polysilazane, or the like impurities, is stable and easy to handle, withstands a long term storage, and gives ceramics of a high purity with a high ceramic yield. Additionally, because of the high molecular weight and the increased crosslinkage of the reformed polysilazane, the solidifiability, moldability and the spinnability are improved. Further, the reformed polysilazane can be easily obtained by a simple method.

The following examples will further illustrate the present invention.

EXAMPLE 1

To a four-necked 1000 ml flask equipped with a gas feed conduit, a mechanical stirrer and a Dewar condenser, an oxygen-free, dry nitrogen gas was fed to replace the inside of the flask therewith. After charging 490 ml of dry pyridine (deaerated), the flask was cooled in an ice bath. Then 51.6 g of dichlorosilane were added into the flask to form a white precipitate of adduct (SiH$_2$Cl$_2$.2C$_5$H$_5$N). Subsequently, with stirring and cooling in the ice bath, 51.0 g of ammonia which had been passed successively through a sodium hydroxide-containing tube and an active carbon-containing tube was bubbled through the reaction mixture within the flask. After completion of the reaction, the reaction mixture was centrifuged and the supernatant was washed with dry pyridine, followed by filtration in a nitrogen atmosphere to give 850 ml of a filtrate containing perhydropolysilazane. When the solvent was removed from the filtrate (5 ml) by evaporation in vacuo, 0.102 g of resinous solid was obtained. Gel permeation chromatography of the polysilazane revealed that the polysilazane had a number-average molecular weight of 980. The IR spectrum of the polysilazane (solvent: dry o-xylene, concentration: 10.2 g/liter) showed absorptions at 3350 cm$^{-1}$ (absorbance index $\epsilon=0.557$ liter/g$^{-1}$.cm$^{-1}$) and 1175 cm$^{-1}$ (based on NH), at 2170 cm$^{-1}$ ($\epsilon=3.14$, based on SiH) and at 1020–820 cm$^{-1}$ (based on SiH and SiNSi). The 60 MHz proton NMR spectrum (solvent: CDCl$_3$, reference: TMS) showed broad signals at 4.8 (SiH$_2$) and 4.4 (SiH$_3$) and at 1.5 (NH). This polysilazane will be hereinafter referred to as polysilazane (I).

Polysilazane (I) was dissolved in pyridine to give 100 ml of a pyridine solution containing 5.04% by weight of polysilazane (I). The solution was charged in an autoclave with a 300 ml inside volume, to which 2.8 g (0.165 mol) of purified anhydrous ammonia were added. The mixture was then reacted at 100° C. under autogeneous pressure for 3 hours with stirring. A large amount of a gas was found to be produced and the pressure within the autoclave was increased by 1.2 kg/cm$^2$ as a result of the reaction. After cooling to room temperature, dry o-xylene (200 ml) was mixed with the reaction mixture. The solvent was then removed by distillation at 50°–70° C. under 3–5 mmHg to give 5.22 g of white powder. This powder (reformed product) was found to be soluble in toluene, tetrahydrofuran and chloroform. Gel permeation chromatography revealed that the reformed product had a number-average molecular weight of 3810. The IR spectrum of the reformed product (solvent: o-xylene) showed absorptions at 3350 cm$^{-1}$ and 1175 cm$^{-1}$ (based on NH), at 2170 cm$^{-1}$ (based on SiH) and at 1020–820 cm$^{-1}$ (based on SiH and SiNSi). The proton NMR spectrum (solvent: CDCl$_3$, reference: TMS) showed broad signals at $\delta$4.8 (SiH$_2$), at $\delta$4.4 (SiH$_3$) and at $\delta$1.5 (NH). The integrated ratio of (SiH$_2$)/(SiH$_3$) was 4.1.

EXAMPLE 2

Polysilazane (I) obtained in Example 1 was dissolved in pyridine to give 80 ml of a pyridine solution containing 10.3 by weight of polysilazane (I). The solution was charged in an autoclave with a 300 ml inside volume, to which 4.1 g of purified anhydrous ammonia were added. The mixture was then reacted at 50° C. under autogeneous pressure for 3 hours with stirring. A large amount of a gas was found to be produced and the pressure within the autoclave was increased by 0.8 kg/cm$^2$ as a result of the reaction. The gas product was identified as being hydrogen upon gas chromatographic analysis. After, cooling to room temperature, dry o-xylene (200 ml) was mixed with the reaction mixture. The solvent was then removed by distillation at 50°–70° C. under 3–5 mmHg to give 8.1 g of white powder which was soluble in toluene, tetrahydrofuran and chloroform. Gel permeation chromatography revealed that this powder (reformed polysilazane) had a number-average molecular weight of 2290. The elementary analysis of the reformed product gave (% by weight):

5 Si: 59.9, N: 28.0, O: 1.42, C: 3.55, H:5.21

The proton NMR spectrum revealed that the integrated ratio (SiH$_2$)/(SoH$_3$) was 4.3. The reformed polysilazane was so stable that no changes were observed with respect to the IR spectrum, proton NMR spectrum and number average molecular weight after storage for 1 months at room temperature in a nitrogen atmosphere.

EXAMPLE 3

The reformed polysilazane obtained in Example 1 was heated to 1000° C. in the atmosphere of nitrogen at a heat-up rate of 10° C./min to obtain a calcined product which was brown ceramic powder. The yield was 86.0% by weight. The powder X-ray diffraction analysis of this ceramic powder showed that this powder was amorphous. The powder was then heated for calcination to 1500° C. at a heating rate of 3° C./min to give light brown solids. The powder X-ray diffraction analysis of this ceramic powder gave the following diffraction lines:

| 2θ (°) | Crystal face | Substance |
|---|---|---|
| 20.5 | (101) | α-Si$_3$N$_4$ |
| 22.9 | (110) | |
| 26.4 | (200) | |
| 30.9 | (201) | |
| 31.7 | (002) | |
| 34.5 | (102) | |
| 35.2 | (210) | |
| 38.8 | (211) | |
| 39.4 | (112) | |
| 40.1 | (300) | |
| 41.8 | (202) | |
| 43.4 | (301) | |
| 46.9 | (220) | |
| 48.2 | (212) | |
| 48.8 | (310) | |
| 23.3 | (110) | β-Si$_3$N$_4$ |
| 26.9 | (200) | |
| 33.6 | (101) | |
| 36.0 | (210) | |
| 41.4 | (201) | |
| 49.9 | (310) | |
| 28.4 | (111) | Si |
| 47.3 | (220) | |

From the X-ray diffraction pattern, the calcined product is identified as being crystalline silicon nitride. The elementary analysis of the calcined product gave (% by weight):

Si 58.1, N: 36.7, O: 1.42, C: 1.45

EXAMPLE 4

Polysilazane (I) obtained in Example 1 was dissolved in a 50:50 (wt/wt) pyridine/o-xylene mixed solvent to give 100 ml of a solution containing 5.64% by weight of polysilazane (I). The solution was charged in an autoclave with a 300 ml inside volume, to which 3.0 g of purified anhydrous ammonia were added. The mixture was then reacted at 120° C. under autogeneous pressure for 3 hours with stirring. A large amount of a gas was found to be produced. After cooling to room temperature, o-xylene was mixted with the reaction mixture. The solvent was then removed by distillation at 50°–70° C. under 3–5 mmHg to give 5.2 g of white powder soluble in toluene, tetrahydrofuran and chloroform. Gel permeation chromatography revealed that this powder (reformed polysilazane) had a number-average molecular weight of 4080.

EXAMPLES 5–7

Example 1 was repeated in the same manner as described except that the pyridine into which polysilazane (I) was dissolved was replaced with the solvent shown in Table 1 below, that polysilazane (I) was used in the concentration shown in Table 1 below and that the amount of ammonia was changed as shown in Table 1. The resultant reformed polysilazane had the properties shown in Table 1.

TABLE 1

|  | Example 5 | Example 6 | Example 7 |
|---|---|---|---|
| Solvent | 4-picoline | trimethylamine | pyrrol |
| Concentration of polysilazane (I), wt % | 5.14 | 10.9 | 6.26 |
| Amount of ammonia (molar ratio to polysilazane (I)) | 0.933 | 0.484 | 0.375 |
| Number average molecular weight | 3610 | 1350 | 1690 |
| Form of reformed polysilazane | white powder | rubber-like solid | rubber-like solid |

EXAMPLE 8

To a four-necked 1000 ml flask equipped with a gas feed conduit, a mechanical stirrer and a Dewar condenser, an oxygen-free, dry nitrogen gas was fed to replace the inside of the flask therewith. After charging 500 ml of dry dichloromethane, the flask was cooled in an ice bath. Then 48.6 g of dichlorosilane were added into the flask. Subsequently, with stirring and cooling in the ice bath, 42.5 g of ammonia which had been passed successively through a sodium hydroxide-containing tube and an active carbon-containing tube was, as a mixture with dry nitrogen gas, bubbled through the reaction mixture within the flask. During the course of the reaction, it was necessary to occasionally beat the gas passage downstream of the flask in order to remove a powdery substance which deposited on and accumulated in the inside surface thereof and to prevent the clogging thereof. After completion of the reaction, the reaction mixture was centrifuged and the supernatant was washed with dry pyridine. After filtration, the solvent was removed from the filtrate by evaporation in vacuo to leave 9.6 g of viscous oily polysilazane. Gel permeation chromatography of the polysilazane revealed that the polysilazane had a number-average molecular weight of 640. This polysilazane will be hereinafter referred to as polysilazane (II).

Polysilazane (II) thus obtained was dissolved in pyridine to give 90 ml of a pyridine solution containing 3.87% by weight of polysilazane (II). The solution was charged in an autoclave with a 300 ml inside volume, to which 2.0 g of purified anhydrous ammonia were added. The mixture was then reacted at 110° C. under autogeneous pressure for 5 hours with stirring. A large amount of a gas was found to be produced so that the pressure within the autoclave was increased by 1.2 kg/cm² as a result of the reaction. After cooling to room temperature, o-xylene was mixed with the reaction mixture. The solvent was then removed by distillation at 50°-70° C. under 3-5 mmHg to give 3.7 g of white powder soluble in toluene, tetrahydrofuran and chloroform. The gel permeation chromatography revealed that this powder (reformed polysilazane) had a number-average molecular weight of 3270. The proton NMR spectrum showed that the integrated ratio $(SiH_2)/(SiH_3)$ of 5.8.

EXAMPLE 9

Polysilazane (I) obtained in Example 1 was dissolved in pyridine to give 100 ml of a pyridine solution containing 5.16% by weight of polysilazane (I). The solution was charged in an autoclave with a 300 ml inside volume, to which 1.5 ml of anhydrous hydrazine was added while cooling the autoclave in an ice bath. A gas was generated as soon as the hydrazine was added. The mixture was reacted at room temperature for 20 hours with stirring. As a result, the pressure within the autoclave was increased by 0.8 kg/cm². After cooling to room temperature, dry o-xylene (200 ml) was mixed with the reaction mixture. The solvent was then removed by distillation at 50°-70° C. under 3-5 mmHg to give white powder. The gel permeation chromatography revealed that the reformed product had a number-average molecular weight of 5690.

EXAMPLE 10

To a four-necked 1000 ml flask equipped with a gas feed conduit, a mechanical stirrer and a Dewar condenser, an oxygen-free, dry nitrogen gas was fed to replace the inside of the flask therewith. After charging 450 ml of deaerated dry tetrahydrofuran, the flask was cooled in a dry ice-methanol bath. Then 46.2 g of dichlorosilane were added into the flask. Subsequently, with stirring and cooling, 44.2 g of anhydrous methylamine was, as a mixture with dry nitrogen gas, bubbled through the reaction mixture within the flask. After completion of the reaction, the reaction mixture was centrifuged and the supernatant was washed with dry tetrahydrofuran, followed by filtration in a nitrogen atmosphere to obtain 820 ml of a filtrate. The solvent was removed from the filtrate by evaporation in vacuo to leave 8.4 g of viscous oily N-methylsilazane. The gel permeation chromatography revealed that the N-methylsilazane had a number-average molecular weight of 1100. This N-methylsilazane will be hereinafter referred to as polysilazane (III).

Polysilazane (III) thus obtained was dissolved in pyridine to give 100 ml of a pyridine solution containing 4.56% by weight of polysilazane (III). The solution was charged in an autoclave with a 300 ml inside volume, to which 3.8 g of purified anhydrous ammonia were added. The mixture was then reacted at 120° C. under autogeneous pressure for 3 hours with stirring. A large amount of a gas was found to be produced so that the inside pressure was increased by 0.7 kg/cm² as a result of the reaction. After cooling to room temperature, o-xylene was mixed with the reaction mixture. The solvent was then removed by distillation at 50°-70° C. under 3-5 mmHg to give light yellow, rubber-like solids. Gel permeation chromatography revealed that these solids (reformed polysilazane) had a number-average molecular weight of 1350.

EXAMPLE 11

To a four-necked 1000 ml flask equipped with a gas feed conduit, a mechanical stirrer and a Dewar condenser, an oxygen-free, dry nitrogen gas was fed to replace the inside of the flask therewith. After charging 300 ml of dry dichloromethane and 24.3 g (0.211 mol) of methyldichlorosilane, the flask was cooled in an ice bath. Then, with stirring and cooling in the ice bath, 18.1 g of ammonia which had been passed successively through a sodium hydroxide-containing tube and an active carbon-containing tube for purification was bubbled through the reaction mixture within the flask. After completion of the reaction, the reaction mixture was centrifuged and the supernatant was washed with dry dichloromethane, followed by filtration in a nitrogen atmosphere. The solvent was removed from the filtrate by evaporation in vacuo to leave 8.81 g of polymethylsilazane in the form of a colorless, transparent liquid. Gel permeation chromatography of the polysilazane revealed that the polysilazane had a number-average molecular weight of 380. This polysilazane will be hereinafter referred to as polysilazane (IV).

Polysilazane (IV) thus obtained was dissolved in pyridine to give 35 ml of a pyridine solution containing 4.50% by weight of polysilazane (IV). The solution was charged in an autoclave with a 300 ml inside volume, to which 1.7 g of purified anhydrous ammonia were added. The mixture was then reacted at 140° C. under autogeneous pressure for 3 hours with stirring. An amount of a gas was found to be produced so that the inside pressure was increased by 0.4 kg/cm$^2$ as a result of the reaction. After cooling to room temperature, the solvent was removed by distillation at 50°–70° C. under 3–5 mmHg to give light yellow, viscous liquid. Gel permeation chromatography revealed that this liquid (reformed polysilazane) had a number-average molecular weight of 600.

EXAMPLE 12

To a four-necked 1000 ml flask equipped with a gas feed conduit, a mechanical stirrer and a Dewar condenser, an oxygen-free, dry nitrogen gas was fed to replace the inside of the flask therewith. After charging 500 ml of dry benzene, the flask was cooled in a water bath. Then 40.6 g of dichlorosilane were added into the flask. Subsequently, with stirring and cooling in the water bath, 42.0 g of ammonia which had been passed successively through a sodium hydroxide-containing tube and an active carbon-containing tube for purification was, as a mixture with dry nitrogen gas, bubbled through the reaction mixture within the flask. During the course of the reaction, it was necessary to occasionally beat the gas passage downstream of the flask in order to remove a powdery substance which deposited on and accumulated in the inside surface thereof and to prevent the clogging thereof. After completion of the reaction, the reaction mixture was centrifuged and the supernatant was washed with dry o-xylene. After filtration, the solvent was removed from the filtrate by evaporation in vacuo to leave 5.2 g of viscous oily perhydropolysilazane. Gel permeation chromatography of the polysilazane revealed that the polysilazane had a number-average molecular weight of 320. This polysilazane is referred to as polysilazane (V) hereinafter.

Polysilazane (V) thus obtained was dissolved in pyridine to give 100 ml of a pyridine solution containing 6.16% by weight of polysilazane (V). The solution was charged in an autoclave with a 300 ml inside volume, to which 2.1 g of purified anhydrous ammonia were added. The mixture was then reacted at 100° C. under autogeneous pressure for 8 hours with stirring. A large amount of a gas was found to be produced so that the pressure within the autoclave was increased by 1.1 kg/cm$^2$ as a result of the reaction. After cooling to room temperature, the solvent was removed by distillation at 50°–70° C. under 3–5 mmHg to give 5.3 g of white powder soluble in toluene, tetrahydrofuran and chloroform. The gel permeation chromatography revealed that this powder (reformed polysilazane) had a number-average molecular weight of 2470. The proton NMR spectrum showed that the integrated ratio (SiH$_2$)/(SiH$_3$) of 6.8.

EXAMPLE 13

The reformed polysilazane obtained in Example 2 was dissolved in o-xylene to give a solution containing 78% by weight of the reformed polysilazane. This solution was ejected from a nozzle into a high temperature atmosphere and the resultant spun fibers were successively wound around a roll. Colorless, transparent, continuous fibers of the reformed polysilazane were obtained.

EXAMPLE 14

To a four-necked 1000 ml flask equipped with a gas feed conduit, a dropping funnel, a mechanical stirrer and a Dewar condenser, an oxygen-free, dry nitrogen gas was fed to replace the inside of the flask therewith. Then, 400 ml of dry benzene and 64.5 g of allyldichlorosilane which had been obtained by the conventional method (J. Am. Chem. Soc., Vol. 67, 1813 (1945)) were added into the flask. While stirring the mixture in the flask, a solution of 42.5 g of triethylaminosilane in 50 ml dry benzene was added dropwise from the dropping funnel. The triethylaminosilane used was obtained by the known method (J. Am. Chem. Soc. Vol. 70, 435 (1948)). Thereafter, the reaction mixture was refluxed in an oil bath with stirring to complete the reaction. The reaction mixture was centrifuged and the supernatant was washed with dry benzene. After filtration in a nitrogen atmosphere, the solvent was removed from the filtrate by evaporation in vacuo to leave 19.2 g of N-(triethylsilyl)allylsilazane in the form of liquid. Gel permeation chromatography of the polysilazane revealed that the polysilazane had a number-average molecular weight of 360. This polysilazane is referred to as polysilazane (VI) hereinafter.

Polysilazane (VI) thus obtained was dissolved in pyridine to give 100 ml of a pyridine solution containing 5.64% by weight of polysilazane (VI). The solution was charged in an autoclave with a 300 ml inside volume, to which 0.8 g of purified anhydrous ammonia were added. The mixture was then reacted at 100° C. under autogeneous pressure for 5 hours with stirring. A large amount of a gas was found to be produced so that the pressure within the autoclave was increased by 0.9 temperature, the solvent was removed by distillation at 50°–70° C. under 3–5 mmHg to give light yellow, rubber-like solids. The gel permeation chromatography revealed that these solids (reformed polysilazane) had a number-average molecular weight of 940.

EXAMPLE 15

To 110 g of trichlorosilane, 62.0 g of Grignard reagent obtained from cyclohexyl bromide were gradually added. The distillation in vacuo of the mixture gave 16.4 g of cyclohexyldichlorosilane. To a four-necked 1000 ml flask equipped with a gas feed conduit, a dropping funnel, a mechanical stirrer and a Dewar condenser, an oxygen-free, dry nitrogen gas was fed to replace the inside of the flask therewith. Then, 420 ml of dry benzene and 12.5 g of allyldichlorosilane obtained above were added into the flask. While stirring the mixture in the flask, a solution of 15.6 g of 1,1-dimethylhydrazine in 40 ml of dry benzene was added dropwise from the dropping funnel. Thereafter, the reaction mixture was stirred at room temperature to complete the reaction. The reaction mixture was centrifuged and the supernatant was washed with dry benzene. After filtration in a nitrogen atmosphere, the solvent was removed from the filtrate (730 ml) by evaporation in vacuo to leave 3.2 g of N-(dimethylamino)cyclohexylsilazane in the form of an oil. Gel permeation chromatography of the polysilazane revealed that the polysilazane had a number-average molecular weight of 390. This polysilazane is referred to as polysilazane (VII) hereinafter.

Polysilazane (VII) thus obtained was dissolved in pyridine to give 100 ml of a pyridine solution containing 4.12% by weight of polysilazane (VII). The solution was charged in an autoclave with a 300 ml inside volume, to which 0.6 g of purified anhydrous ammonia was added. The mixture was then reacted at 80° C. under autogeneous pressure for 6 hours with stirring. A large amount of a gas was found to be produced so that the pressure within the autoclave was increased by 0.8 kg/cm$^2$ as a result of the reaction. After cooling to room temperature, the solvent was removed by distillation at 50°-70° C. under 3-5 mmHg to give light yellow, rubber-like solids. The gel permeation chromatography revealed that these solids (reformed polysilazane) had a number-average molecular weight of 1080.

EXAMPLE 16

The reformed polysilazane obtained in Example 2 was heated to 1450° C. in the atmosphere of a 50:50 (vol/vol) nitrogen/ammonia mixed gas at a heating rate of 10° C./min and calcined at that temperature for 3 hours to obtain a calcined product in the form of light brown solids with a yield of 87.2% by weight. Upon the powder X-ray diffraction analysis, the calcined product is identified as being crystalline silicon nitride of $\alpha$—Si$_3$N$_4$ and $\beta$—Si$_3$N$_4$.

EXAMPLE 17

The reformed polysilazane obtained in Example 4 was heated to 1500° C. in the atmosphere of hydrogen at a heating rate of 5° C./min and calcined at that temperature for 5 hours to obtain a calcined product in the form of light brown solids with a yield of 85.4% by weight. Upon the powder X-ray diffraction analysis, the calcined product is identified as being crystal silicon nitride of $\alpha$—Si$_3$N$_4$ and $\beta$—Si$_3$N$_4$.

EXAMPLE 18

The reformed polysilazane obtained in Example 10 was heated to 1600° C. in vacuum (3-4 mmHg) at a heating rate of 3° C./min and calcined at that temperature for 6 hours to obtain a calcined product in the form of dark brown solids with a yield of 77.3% by weight upon the powder X-ray diffraction analysis, the calcined product is identified as being $\alpha$—Si$_3$N$_4$, $\beta$—Si$_3$N$_4$ and SiC (8F type).

EXAMPLE 19

To a four-necked 1000 ml flask equipped with a gas feed conduit, a mechanical stirrer and a Dewar condenser, an oxygen-free, dry nitrogen gas was fed to replace the inside of the flask therewith After charging 500 ml of dry toluene, the flask was cooled in an ice bath. Then 52.1 g of phenyldichlorosilane were added into the flask subsequently, with stirring and cooling in the ice bath, 30.0 g of ammonia which had been passed successively through a sodium hydroxidecontaining tube and an active carbon-containing tube was bubbled through the reaction mixture within the flask. After completion of the reaction, the reaction mixture was centrifuged and the supernatant was washed with dry pyridine, followed by filtration in a nitrogen atmosphere. The solvent was removed from the filtrate by evaporation in vacuo to leave 6.8 g of oily phenylpolysilazane. Gel permeation chromatography revealed that the polysilazane had a number-average molecular weight of 380. This polysilazane will be hereinafter referred to as polysilazane (VIII).

Polysilazane (VIII) was dissolved in pyridine to give 100 ml of a pyridine solution containing 6.04% by weight of polysilazane (VIII). The solution was charged in an autoclave with a 300 ml inside volume, to which 0.6 g of purified anhydrous ammonia was added. The mixture was then reacted at 120° C. under autogeneous pressure for 6 hours with stirring A large amount of a gas was found to be produced and the pressure within the autoclave was increased by 0.5 kg/cm$^2$ as a result of the reaction. After cooling to room temperature, the solvent was removed by distillation at 50°-70° C. under 3-5 mmHg to give colorless, transparent, rubber-like solids. These solids (reformed product) was found to have a number-average molecular weight of 1090 upon analysis by gel permeation chromatography.

EXAMPLE 20

Polysilazane (I) obtained in Example 1 was dissolved in pyridine to give 100 ml of a pyridine solution containing 5.26% by weight of polysilazane (I). The solution was charged in an autoclave with a 300 ml inside volume, to which 2 ml (20.2 mmol) of dehydrated n-butylamine used as a cross-linking agent were added. The mixture was then reacted at 120° C. under autogeneous pressure for 3 hours with stirring A large amount of a gas was found to be produced and the pressure within the autoclave was increased by 2.0 kg/cm$^2$ as a result of the reaction. After cooling to room temperature, dry o-xylene (200 ml) was mixed with the reaction mixture. The solvent was then removed by distillation at 50°-70° C. under 3-5 mmHg to give 5.1 g of white powder. This powder (reformed product) was found to be soluble in toluene, tetrahydrofuran and chloroform. Gel permeation chromatography revealed that the reformed product had a number-average molecular weight of 3820. The IR spectrum of the reformed product (solvent: toluene) showed absorptions at 3350 cm$^{-1}$ and 1175 cm$^{-1}$ (based on NH), at 2170 cm$^{-1}$ (based on SiH), at 1020-820 cm$^{-1}$ (based on SiH and SiNSi) at 2690, 2930, 2880, 1460 and 1380 cm$^{-1}$ (based on CH) and at 1090 cm$^{-1}$ (based on CN). The proton NMR spectrum (solvent: CDCl$_3$, reference: TMS) showed broad signals at $\delta$4.8 (SiH$_2$) at $\delta$4.4 (SiH$_3$), at $\delta$2.7 (CH$_2$), at $\delta$1.4 (NH) and at 0.9 (CH$_3$). The elementary analysis of the reformed product gave (% by weight):

Si: 57.4, N: 26.8, O: 3.63, C: 9.30

EXAMPLE 21

Polysilazane (I) obtained in Example 1 was dissolved in pyridine to give 100 ml of a pyridine solution containing 5.12% by weight of polysilazane (I). The solution was charged in an autoclave with a 300 ml inside volume, to which 15 ml of aniline purified by distillation in vacuo were added. The mixture was then reacted at 120° C. under autogeneous pressure for 3 hours with stirring A large amount of a gas was found to be produced and the pressure within the autoclave was increased by 1.7 kg/cm$^2$ as a result of the reaction. The gas product was identified as being hydrogen upon gas chromatographic analysis. After cooling to room temperature, dry o-xylene (200 ml) was mixed with the reaction mixture. The solvent was then removed by distillation at 50°-70° C. under 3-5 mmHg to give 4.9 g of white powder which was soluble in toluene, tetrahydrofuran and chloroform. Gel permeation chromatography revealed that this powder (reformed polysilazane) had a number-average molecular weight of 1720. The IR spectrum of the reformed product (solvent: o-xylene) showed absorptions at 3350 cm$^{-1}$ and 1175 cm$^{-1}$ (based on NH), at 2170 cm$^{-1}$ (based on SiH), at 1020-820 cm$^{-1}$ (based on SiH and SiNSi) at 3050, 755 and 695 cm$^{-1}$ (based on CH), at 1610 and 1495 cm$^{-1}$ (based on CC) and at 1290 cm$^{-1}$ (based on CN). The proton NMR spectrum (solvent: CDCl$_3$, reference: TMS) showed broad signals at $\delta$7.2 (CH), at $\delta$6.7 (CH), at $\delta$4.8 (SiH$_2$) at $\delta$4.4 (SiH$_3$) and at $\delta$1.5 (NH).

EXAMPLE 22

Polysilazane (I) obtained in Example 1 was dissolved in pyridine to give 50 ml of a solution containing 5.26% by weight of polysilazane (I). The solution was charged in an autoclave with a 300 ml inside volume, to which 15 ml of methylhydrazine were added. The mixture was then reacted at 25° C. under autogeneous pressure for 1 hour with stirring. A large amount of a gas was found to be produced so that the inside pressure was increased by 1.2 kg/cm$^2$. After cooling to room temperature, o-xylene was mixed with the reaction mixture. The solvent was then removed by distillation at 50°-70° C. under 3-5mmHg to give 2.4 g of white powder which was soluble in toluene, tetrahydrofuran and chloroform. Gel permeation chromatography revealed that this powder (reformed polysilazane) had a number average molecular weight of 2250. The IR spectrum of the reformed product (solvent: o-xylene) showed absorptions at 3350 cm$^{-1}$ and 1175 cm$^{-1}$ (based on NH), at 2170 cm$^{-1}$ (based on SiH), at 1020-820 cm$^{-1}$ (based on SiH and SiNSi) and at 2950, 2850, 2800 and 1440 cm$^{-1}$ (based on CH). The proton NMR spectrum (solvent: CDCl$_3$, reference: TMS) showed broad signals at $\delta$4.8 (SiH$_2$), at $\delta$4.4 (SiH$_3$), at $\delta$3.3 (CH$_3$) and at $\delta$1.5 (NH).

EXAMPLES 23-26

Example 20 was repeated in the same manner as described except that polysilazane (I) was used in the concentration shown in Table 2 below, that the reaction temperature was changed as shown in Table 2 and that the amount and the kind of the cross-linking agent was changed as shown in Table 2. The resultant reformed polysilazane had the properties shown in Table 2.

TABLE 2

|  | Example 23 | Example 24 | Example 25 | Example 26 |
| --- | --- | --- | --- | --- |
| Cross-linking agent | DMH*$^1$ | MPH*$^2$ | CHA*$^3$ | allylamine |
| Amount of cross-linking agent*$^4$ | 10 | 20 | 2 | 5 |
| Concentration of polysilazane (I), wt % | 5.12 | 2.56 | 6.72 | 8.84 |
| Reaction temperature, °C. | 80 | 80 | 100 | 80 |
| Number average molecular weight | 2150 | 2270 | 2870 | 2220 |
| Form of reformed polysilazane | white powder | white powder | white powder | white powder |

*$^1$DMH: 1,1-Dimethylhydrazine
*$^2$MPH: 1-Methyl-2-phenylhydrazine
*$^3$CHA: Cyclohexylamine
*$^4$Molar ratio of the cross-linking agent to polysilazane (I)

EXAMPLE 27

Polysilazane (II) obtained in Example 8 was dissolved in pyridine to give 100 ml of a pyridine solution containing 5.83% by weight of polysilazane (II). The solution was charged in an autoclave with 300 ml inside volume, to which 5.5 g of p-toluene were added. The mixture was then reacted at 120° C. under autogeneous pressure for 3 hours with stirring. A large amount of a gas was found to be produced so that the pressure within the autoclave was increased by 0.8 kg/cm$^2$ as a result of the reaction. After cooling to room temperature, o-xylene was mixted with the reaction mixture. The solvent was then removed by distillation at 50°-70° C. under 3-5 mmHg to give 5.5 g of white powder soluble in toluene, tetrahydrofuran and chloroform. The gel permeation chromatography revealed that this powder (reformed polysilazane) had a number-average molecular weight of 2480.

EXAMPLE 28

Polysilazane (III) obtained in Example 10 was dissolved in pyridine to give 100 ml of a pyridine solution containing 9.56% by weight of polysilazane (III). The solution was charged in an autoclave with a 300 ml inside volume, to which 10 ml of benzylhydrazine were added. The mixture was then reacted at 80° C. under autogeneous pressure for 3 hours with stirring. A large amount of a gas was found to be produced so that the inside pressure was increased by 0.7 kg/cm$^2$ as a result of the reaction. After cooling to room temperature, o-xylene was mixed with the reaction mixture. The solvent was then removed by distillation at 50°-70° C. under 3-5 mmHg to give light yellow, rubber-like solids. Gel permeation chromatography revealed that these solids (reformed polysilazane) had a number-average molecular weight of 1890.

EXAMPLE 29

Polysilazane (IV) obtained in Example 11 was dissolved in $\gamma$-picoline to give 80 ml of a solution containing 10.4% by weight of polysilazane (III). The solution was charged in an autoclave with a 300 ml inside volume, to which 30 ml of aniline were added. The mixture was then reacted at 150° C. under autogeneous pressure for 6 hours with stirring. An amount of a gas was found to be produced so that the inside pressure was increased by 0.5 kg/cm$^2$ as a result of the reaction. After cooling to room temperature, the solvent was removed by distillation at 50°-70° C. under 3-5 mmHg to give light yellow, rubber-like solids. Gel permeation chromatography revealed that these solids (reformed polysilazane) had a number-average molecular weight of 1680.

EXAMPLE 30

Polysilazane (V) obtained in Example 11 was dissolved in pyridine to give 100 ml of a pyridine solution containing 8.53% by weight of polysilazane (V). The solution was charged in an autoclave with a 300 ml inside volume, to which 15 ml of phenylhydrazine were added. The mixture was then reacted at 80° C. under autogeneous pressure for 3 hours with stirring. A large amount of a gas was found to be produced so that the pressure within the autoclave was increased by 0.6 kg/cm$^2$ as a result of the reaction. After cooling to room temperature, the solvent was removed by distillation at 50°-70° C. under 3-5 mmHg to give yellowish brown solids. The gel permeation chromatography revealed that these solids (reformed polysilazane) had a number-average molecular weight of 2770.

EXAMPLE 31

Polysilazane (VI) obtained in Example 14 was dissolved in pyridine to give 100 ml of a pyridine solution containing 7.27% by weight of polysilazane (VI). The solution was charged in an autoclave with a 300 ml inside volume, to which 20 ml of isopropylamine were added. The mixture was then reacted at 100° C. under autogeneous pressure for 5 hours with stirring. A large amount of a gas was found to be produced so that the pressure within the autoclave was increased by 0.5 kg/cm$^2$ as a result of the reaction. After cooling to room temperature, the solvent was removed by distillation at 50°-70° C. under 3-5 mmHg to give light yellow, rubber-like solids. The gel permeation chromatography revealed that these solids (reformed polysilazane) had a number-average molecular weight of 1650.

EXAMPLE 32

Polysilazane (VII) obtained in Example 15 was dissolved in pyridine to give 50 ml of a pyridine solution containing 5.53% by weight of polysilazane (VII). The solution was charged in an autoclave with a 300 ml inside volume, to which 15 ml of 1,2-dimethylhydrazine were added. The mixture was then reacted at 120° C. under autogeneous pressure for 6 hours with stirring. A large amount of a gas was found to be produced so that the pressure within the autoclave was increased by 0.3 kg/cm$^2$ as a result of the reaction. After cooling to room temperature, the solvent was removed by distillation at 50°-70° C. under 3-5 mmHg to give light yellow, rubber-like solids. The gel permeation chromatography revealed that these solids (reformed polysilazane) had a number-average molecular weight of 1530.

EXAMPLE 33

Polysilazane (VIII) obtained in Example 19 was dissolved in pyridine to give 100 ml of a pyridine solution containing 5.15% by weight of polysilazane (VIII). The solution was charged in an autoclave with a 300 ml inside volume, to which 10 ml of 1-isopropyl-2-methylhydrazine were added. The mixture was then reacted at 100° C. under autogeneous pressure for 3 hours with stirring. A large amount of a gas was found to be produced and the pressure within the autoclave was increased by 1.0 kg/cm$^2$ as a result of the reaction. After cooling to room temperature, the solvent was removed by distillation at 50°-70° C. under 3-5 mmHg to give white powder. This powder (reformed product) was found to have a number-average molecular weight of 2210 upon analysis by gel permeation chromatography.

EXAMPLE 34

Polysilazane (I) obtained in Example 1 was dissolved in pyridine to give 100 ml of a pyridine solution containing 10.3% by weight of polysilazane (I). The solution was charged in an autoclave with a 300 ml inside volume, to which 3 ml (29.0 mmol) of dehydrated diethylamine were added. The mixture was then reacted at 110° C. under autogeneous pressure for 3 hours with stirring. A large amount of a gas was found to be produced and the pressure within the autoclave was increased by 2.2 kg/cm$^2$ as a result of the reaction. The gas evolved was found to be hydrogen by gas-chromatography. After cooling to room temperature, dry o-xylene (200 ml) was mixed with the reaction mixture. The solvent was then removed by distillation at 50°-70° C. under 3-5 mmHg to give 5.1 g of white powder. This powder (reformed product) was found to be soluble in toluene, tetrahydrofuran and chloroform. Gel permeation chromatography revealed that the reformed product had a number-average molecular weight of 5240. The IR spectrum of the reformed product (solvent: toluene) showed absorptions at 3350 cm$^{-1}$ and 1175 cm$^{-1}$ (based on NH), at 2170 cm$^{-1}$ (based on SiH), at 1020-820 cm$^{-1}$ (based on SiH and SiNSi) at 2690, 2930, 2880, 1460 and 1380 cm$^{-1}$ (based on CH) and at 1090 cm$^{-1}$ (based on CN). The proton NMR spectrum (solvent: CDCl$_3$, reference: TMS) showed broad signals at 4.8 (SiH$_2$) at 4.4 (SiH$_3$), at 2.7 (CH$_2$), at 1.4 (NH) and at 0.9 (CH$_3$). The elementary analysis of the reformed product gave (% by weight):

Si: 50.1, N: 25.8, O: 3.6, C: 12.4, H: 7.3

EXAMPLES 35

Polysilazane (I) obtained in Example 1 was dissolved in g-picoline to give 80 ml of a pyridine solution containing 5.76% by weight of polysilazane (I). The solution was charged in an autoclave with a 300 ml inside volume, to which 5 ml of trimethylhydrazine were added. The mixture was then reacted at 120° C. under autogeneous pressure for 3 hours with stirring. A large amount of a gas was found to be produced and the pressure within the autoclave was increased by 2.0 kg/cm$^2$ as a result of the reaction. After cooling to room temperature, dry o-xylene (200 ml) was mixed with the reaction mixture. The solvent was then removed by distillation at 50°-70° C. under 3-5 mmHg to give 4.9 g of white powder which was soluble in toluene, tetrahydrofuran and chloroform. Gel permeation chromatography revealed that this powder (reformed polysilazane) had a number-average molecular weight of 3080.

EXAMPLE 36

Polysilazane (II) obtained in Example 8 was dissolved in pyridine to give 100 ml of a pyridine solution containing 7.04% by weight of polysilazane (II). The solution was charged in an autoclave with a 300 ml inside volume, to which 25 ml of N-methylaniline were added. The mixture was then reacted at 100° C. under autogeneous pressure for 6 hours with stirring. A large amount of a gas was found to be produced so that the pressure within the autoclave was increased by 1.8 kg/cm$^2$ as a result of the reaction. After cooling to room temperature, oxylene was mixed with the reaction mixture. The solvent was then removed by distillation at 50°-70° C. under 3-5 mmHg to give 6.8 g of light yellow powder which was soluble in toluene, tetrahydrofuran and chloroform. The gel permeation chromatography revealed that this powder (reformed polysilazane) had a number-average molecular weight of 2740.

EXAMPLE 37

Polysilazane (III) obtained in Example 10 was dissolved in pyridine to give 60 ml of a pyridine solution containing 12.4% by weight of polysilazane (III). The solution was charged in an autoclave with a 300 ml inside volume, to which 20 g of 1,2-dimethyl-1-phenylhydrazine were added. The mixture was then reacted at 150° C. under autogeneous pressure for 5 hours with stirring. A gas was found to be produced so that the inside pressure was increased by 0.3 kg/cm$^2$ as a result of the reaction. After cooling to room temperature, o-xylene was mixed with the reaction mixture. The solvent was then removed by distillation at 50°–70° C. under 3–5 mmHg to give 6.3 g of light yellow, wax-like solid having a melting point of about 200° C. Gel permeation chromatography revealed that this product (reformed polysilazane) had a number-average molecular weight of 1480.

EXAMPLE 38

Polysilazane (IV) obtained in Example 11 was dissolved in pyridine to give 100 ml of a solution containing 8.16% by weight of polysilazane (III). The solution was charged in an autoclave with a 300 ml inside volume, to which 15 ml of dipropylamine were added. The mixture was then reacted at 120° C. under autogeneous pressure for 6 hours with stirring. A gas was found to be produced so that the inside pressure was increased by 0.4 kg/cm$^2$ as a result of the reaction. After cooling to room temperature, the solvent was removed by distillation at 50°–70° C. under 3–5 mmHg to give 7.8 g of white wax-like solid. Gel permeation chromatography revealed that this product (reformed polysilazane) had a number-average molecular weight of 1720.

EXAMPLE 39

Polysilazane (V) obtained in Example 11 was dissolved in pyridine to give 100 ml of a pyridine solution containing 5.59% by weight of polysilazane (V). The solution was charged in an autoclave with a 300 ml inside volume, to which 8 ml of trimethylhydrazine were added. The mixture was then reacted at 120° C. under autogeneous pressure for 3 hours with stirring. A large amount of a gas was found to be produced so that the pressure within the autoclave was increased by 0.8 kg/cm$^2$ as a result of the reaction. After cooling to room temperature, the solvent was removed by distillation at 50°–70° C. under 3–5 mmHg to give 5.2 g of white powder. The gel permeation chromatography revealed that this powder (reformed polysilazane) had a number-average molecular weight of 2250.

EXAMPLE 40

Polysilazane (VI) obtained in Example 14 was dissolved in pyridine to give 60 ml of a pyridine solution containing 6.47% by weight of polysilazane (VI). The solution was charged in an autoclave with a 300 ml inside volume, to which 15 ml of diethylamine were added. The mixture was then reacted at 160° C. under autogeneous pressure for 6 hours with stirring. A gas was found to be produced so that the pressure within the autoclave was increased by 0.3 kg/cm$^2$ as a result of the reaction. After cooling to room temperature, the solvent was removed by distillation at 50°–70° C. under 3–5 mmHg to give 3.2 g of light yellow, wax-like solid having a melting point of about 180° C. The gel permeation chromatography revealed that this product (reformed polysilazane) had a number-average molecular weight of 1350.

EXAMPLE 41

Polysilazane (VII) obtained in Example 15 was dissolved in pyridine to give 80 ml of a pyridine solution containing 3.2% by weight of polysilazane (VII). The solution was charged in an autoclave with a 300 ml inside volume, to which 10 ml of dibutylamine were added. The mixture was then reacted at 120° C. under autogeneous pressure for 8 hours with stirring. A gas was found to be produced so that the pressure within the autoclave was increased by 0.2 kg/cm$^2$ as a result of the reaction. After cooling to room temperature, the solvent was removed by distillation at 50°–70° C. under 3–5 mmHg to give 2.0 g of light yellow, wax-like solid having a melting point of about 150° C. The gel permeation chromatography revealed that this product (reformed polysilazane) had a number-average molecular weight of 1110.

EXAMPLE 42

Polysilazane (VIII) obtained in Example 19 was dissolved in pyridine to give 100 ml of a pyridine solution containing 8.14% by weight of polysilazane (VIII). The solution was charged in an autoclave with a 300 ml inside volume, to which 30 ml of dipropylamine were added. The mixture was then reacted at 150° C. under autogeneous pressure for 6 hours with stirring. A gas was found to be produced and the pressure within the autoclave was increased by 0.4 kg/cm$^2$ as a result of the reaction. After cooling to room temperature, the solvent was removed by distillation at 50°–70° C. under 3–5 mmHg to give 7.3 g of white wax-like solid. This product (reformed polysilazane) was found to have a number-average molecular weight of 1310 upon analysis by gel permeation chromatography.

EXAMPLE 43

The reformed polysilazane (number-average molecular weight: 3810) obtained in Example 1 was dissolved in o-xylene, to which silicon carbide (average particle size: about 10 μ) was mixed, thereby to obtain a dispersion containing 30% by weight of reformed polysilazane, 50% by weight of silicon carbide and 20% by weight of o-xylene. The dispersion was coated on a SUS 304 stainless steel plate by spray coating. The coated substrate was then heated to 400° C. at a heating rate of 3° C./min in an oven under a nitrogen atmosphere for drying. The dried coat had a thickness of about 160 μm and a pencil hardness of 9H or more. The coat exhibited excellent adhesion to the substrate and was free of cracks.

EXAMPLE 44

A dispersion containing 25% by weight of the reformed polysilazane, 69.5% by weight of silicon carbide, 0.5% by weight of hexamethyldisilazane (adjuvant) and 5% by weight of o-xylene was prepared in the same manner as that in Example 43. The dispersion was applied over the surface of a SUS 304 stainless steel plate by brush coating. The coat was dried and calcined at 1000° C. for 1 hour in the nitrogen atmosphere. The coated layer thus obtained had a pencil hardness of 9H or more and exhibited excellent adhesion to the substrate. No cracks were observed.

EXAMPLE 45

A dispersion containing 50% by weight of the reformed polysilazane, 30% by weight of silicon carbide and 20 by weight of o-xylene was prepared in the same manner as that in Example 43. The dispersion was applied over the surface of a SUS 304 stainless steel plate by immersion coating. The coat was dried and calcined at 200° C. for 1 hour in air. The coated layer thus obtained had a pencil hardness of 7H and exhibited excellent adhesion to the substrate. No cracks were observed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

We claim:

1. A reformed polysilazane having a number average molecular weight of 200–500,000 and containing (a) skeletal groups of repeating units of the formula:

wherein $R_1$ and $R_2$, independently from each other, stand for hydrogen, alkyl, alkenyl, cycloalkyl, alkylamino, aryl or alkylsilyl, and (b) or (c) wherein said (b) consists of one or more bridges, cross-linking said skeletal groups, of the formula:

said bridge or bridges being attached to silicon atoms of said repeating units by replacement of hydrogen; wherein A stands for a direct bond or —N($R_4$)— where $R_4$ stands for hydrogen, alkyl, cycloalkyl, aryl or aralkyl, and $R_3$ stands for (1) hydrogen, alkyl alkenyl, cycloalkyl, aryl, aralkyl or —N($R_5$)($R_6$)— where $R_5$ and $R_6$, independently from each other, stand for alkyl, cycloalkyl, aryl or aralkyl, when the group A is a direct bond or (2) hydrogen, alkyl, alkenyl, cycloalkyl, aryl or aralkyl, when the group A is —N($R_4$)—, and said (c) consists of one or more groups, replacing hydrogen on and pendent from the silicon atoms of said repeating units, of the formula:

wherein A, $R_5$ and $R_6$ have the same meaning as above.

2. A reformed polysilazane according to claim 1, wherein the number-average molecular weight of said reformed polysilazane is 1,000 to 50,000.

3. The reformed polysilazane of claim 1 wherein said skeletal groups are cyclic groups.

4. The reformed polysilazane of claim 1 wherein said skeletal groups are linear.

5. The reformed polysilazane of claim 1 wherein a portion of said skeletal groups are cyclic and the remainder of said skeletal groups are linear.

6. A method of reforming a polysilazane having a number average molecular weight of 100–50,000 and containing a recurring unit of the formula:

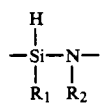

wherein $R_1$ and $R_2$, independently from each other, stand for hydrogen, alkyl, alkenyl, cycloalkyl, alkylamino, aryl or alkylsilyl, said method comprising forming a solution of said polysilazane in an organic base-containing solvent, non-reactive with said polysilazane, and reacting said polysilazane, in solution, with a compound selected from the group consisting of:

1. ammonia;
2. hydrazine;
3. primary amines of the formula $R_3NH_2$;
4. 1-mono-substituted hydrazines of the formula $R_2NH-NH_2$;
5. 1,2-disubstituted hydrazines of the formula $R_3NH-NHR_4$;
6. 1,1-di-substituted hydrazines of the formula $R_6R_7N-NH_2$;
7. dimethylamine, diethylamine, methylethylamine, dipropylamine, diisopropylamine, methylpropylamine, dibutylamine, diamylamine, dihexylamine, diheptylamine, dioctylamine, diallylamine, allylcyclohexylamine, methylaniline, ethylaniline, dibenzylamine, diphenylamine, dicyclohexylamine and N-cyclohexylaniline;

wherein $R_4$ stands for hydrogen, alkyl, alkenyl, cycloalkyl, aryl or aralkyl, and $R_3$ and $R_7$, independently from each other, stand for hydrogen, alkyl, alkenyl, cycloalkyl, aryl or aralkyl.

7. A method according to claim 6, wherein the organic base-containing solvent is a non-basic organic solvent having dissolved therein an organic base.

8. A method according to claim 7, wherein said organic base is a member selected from the group consisting of tertiary amines, phosphines and mixtures thereof and said non-basic organic solvent is a member selected from the group consisting of m ethylene chloride, chloroform, carbon tetrachloride, bromoform, ethylene chloride, ethylidene chloride, trichloroethane, tetrachloroethane, ethyl ether, isopropyl ether, ethyl butyl ether, butyl ether, 1,2-dioxyethane, dioxane, dimethyl dioxane, tetrahydrofurna, tetrahydropyrane, pentane, hexane, isohexane, methylpentane, heptane, isoheptane, oxtane, isooctane, cyclopentane, methylcyclopentane, cyclohexane, methylcyclohexane, benzene, toluene, xylene, ethylbenzene and mixtures thereof.

9. A method according to claim 6, wherein said polysilazane solution has a concentration of 0.1–50% by weight.

10. A method according to claim 6, wherein said compound is used in an amount of 0.001–2000 mols per mole of said polysilazane when the compound of the formula (I) is ammonia or hydrazine and in an amount of 0.01–5000 mols per mole of aid polysilazane when said compound of the formula (I) is an amine or a substituted hydrazine.

11. A method according to claim 6, wherein said polysilazane has a number-average molecular weight of 100–50,000 and said reaction is performed so that the resulting reformed, polysilazane has a number-average molecular weight of 200– 500,000.

12. A method according to claim 6, wherein the organic base-containing solvent consists of a liquid organic base.

13. A method according to claim 12, wherein the liquid organic base is a member selected from the group consisting of trimethylamine, dimethylethylamine, diethylmethylamine, triethylamine, pyridine and a substituted pyridine, dimethylaniline and a substituted dimethylaniline, pyrazine and a substituted pyrazine, pyrimidine and a substituted pyrimidine, pyridazine and a substituted pyridazine pyrrole, 3-pyrroline, pyrazole, 2-pyrazoline and mixtures thereof.

14. A method according to claim 6, wherein said reaction is performed so as to increase the N/Si molar ratio of said polysilazane.

15. The method of claim 6 wherein said polysilazane has a number-average molecular weight of 300–2,000.

16. The method of claim 6 wherein said polysilazane has a number-average molecular weight of 600–1,400.

17. A reformed polysilazane having a number average molecular weight of 200–500,000 and containing (a) skeletal groups of repeating units of the formula:

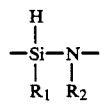

wherein $R_1$ and $R_2$, independently from each other, stand for hydrogen, alkyl, alkenyl, cycloalkyl, alkylamino, aryl or alkylsilyl, and (b) or (c) wherein said (b) consists of one or more bridges, cross-linking said skeletal groups, of the formula:

said bridge or bridges being attached to silicon atoms of said repeating units by replacement of hydrogen; wherein A stands for a direct bond or —N(R$_4$)— where R$_4$ stands for hydrogen, alkyl, cycloalkyl, aryl or aralkyl, and R$_3$ stands for (1) hydrogen, alkyl, alkenyl, cycloalkyl, aryl aralkyl or —N(R$_5$)(R$_6$)— where R$_5$ and R$_6$, independently from each other, stand for alkyl, cycloalkyl, aryl or aralkyl, when the group A is a direct bond or (2) hydrogen, alkyl, alkenyl, cycloalkyl, aryl or aralkyl, when the group A is —N(R$_4$)—, and said (c) consists of one or more groups, replacing hydrogen on and pendent from the silicon atoms of said repeating units, of the formula:

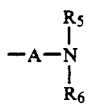

wherein A, R$_5$ and R$_6$, have the same meaning as above;
said reformed polysilazane being formed by a method comprising:
forming, in an organic base-containing solvent, a solution of a polysilazane having a number average molecular weight of 100–50,000 and containing a recurring unit of the formula:

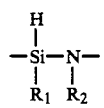

wherein $R_1$ and $R_2$, independently from each other, stand for hydrogen, alkyl, alkenyl, cycloalkyl, alkylamino, aryl or alkylsilyl, said organic base being non-reactive with said polysilazane; and
reacting said polysilazane, in solution, with a compound selected from the group consisting of;
 1. ammonia;
 2. hydrazine;
 3. primary amines of the formula R$_3$NH$_2$;
 4. 1-mono-substituted hydrazines of the formula R$_3$NH—NH$_2$;
 5. 1,2-di-substituted hydrazines of the formula R$_3$NH—NHR$_4$;
 6. 1,1-di-substituted hydrazines of the formula R$_3$R$_7$N—NH$_2$;
 7. dimethylamine, diethylamine, methylethylamine, dipropylamine, diisopropylamine, methylpropylamine, dibutylamine, diamylamine, dihexylamine, diheptylamine, dioctylamine, diallylamine, allylcyclohexylamine, methylaniline, ethylaniline, dibenzylamine, diphenylamine, dicyclohexylamine and N-cyclohexylaniline;
 wherein R$_4$ stands for hydrogen, alkyl, alkenyl, cycloalkyl, aryl or aralkyl, and R$_3$ and R$_7$, independently from each other, stand for hydrogen, alkyl, alkenyl, cycloalkyl, aryl or aralkyl.

* * * * *

UNITED STATES PATENT AND TRADEMARK OFFICE
CERTIFICATE OF CORRECTION

PATENT NO. : 4,975,512
DATED : December 4, 1990
INVENTOR(S) : FUNAYAMA et al

It is certified that error appears in the above-identified patent and that said Letters Patent is hereby corrected as shown below:

Col. 1, line 13, "$-SiH_2NH_n$" should read --$(SiH_2NH)_n$--.

Col. 2, line 21, "other" should read --other,--.

Col. 5, line 17, "2000mols," should read --2000 mols,--.

Col. 6, line 68, "trisubstituted" should read

--tri-substituted--.

Col. 8, line 21, "$(=3S_2H/2S_3H)$" should read

--$(=3S_{2H}/2S_{3H})$--.

Col. 9, line 8, "ter/g" should read --ter·g--;

line 8, "$.cm^{-1}$" should read --$\cdot cm^{-1}$--;

line 44, insert --%-- after "10.3";

line 53, delete "," after "After";

line 63, delete "5" before "Si:"; and line 66, "$(SoH_3)$" should read --$(SiH_3)$--.

Col. 14, line 44, insert --$kg/cm^2$ as a result of the reaction. After cooling to room-- after "0.9".

Col. 15, line 41, "crystal" should read --crystalline--;

line 49, insert --.-- after "weight";

UNITED STATES PATENT AND TRADEMARK OFFICE
CERTIFICATE OF CORRECTION

PATENT NO. : 4,975,512                              Page 2 of 3

DATED : December 4, 1990

INVENTOR(S) : FUNAYAMA et al

It is certified that error appears in the above-identified patent and that said Letters Patent is hereby corrected as shown below:

line 50, "upon" should read --Upon--;

line 58, insert --.-- after "therewith";

line 61, "flask subsequently," should read --flask. Subsequently,--; and line 63, "hydroxidecontaining" should read --hydroxide-containing--.

Col. 16, line 13, insert --.-- after "stirring"; and line 32, insert --.-- after "stirring".

Col. 17, line 31, "3-5mmHg" should read --3-5 mmHg--.

Col. 18, line 16, "p-toluene" should read --p-toluidine--.

Col. 23, line 1, insert --%-- after "20"; and line 42, insert --,-- after "alkyl".

Col. 24, line 21, "$R_2NH$" should read --$R_3NH$--;

line 26, "$R_6R_7N$" should read --$R_3R_7N$--;

line 46, "m ethylene" should read --methylene--;

line 51, "tetrahydrofurna" should read --tetrahydrofuran--;

UNITED STATES PATENT AND TRADEMARK OFFICE
CERTIFICATE OF CORRECTION

PATENT NO. : 4,975,512

DATED : December 4, 1990

INVENTOR(S) : FUNAYAMA et al

Page 3 of 3

It is certified that error appears in the above-identified patent and that said Letters Patent is hereby corrected as shown below:

line 53, "oxtane" should read --octane--; and line 63, "aid" should read --said--.

Col. 25, line 46, insert --,-- after "aryl".

Signed and Sealed this

Eighteenth Day of August, 1992

Attest:

DOUGLAS B. COMER

Attesting Officer

Acting Commissioner of Patents and Trademarks